March 19, 1946.    E. A. ROOP    2,397,048
PIPE-SHEARING MECHANISM
Filed Aug. 16, 1944    4 Sheets-Sheet 1

INVENTOR.
ELSTON A. ROOP
BY Arthur H Robert
Atty

March 19, 1946.  E. A. ROOP  2,397,048
PIPE-SHEARING MECHANISM
Filed Aug. 16, 1944  4 Sheets-Sheet 2

INVENTOR.
ELSTON A. ROOP
BY Arthur H Robert
Atty

March 19, 1946.  E. A. ROOP  2,397,048
PIPE-SHEARING MECHANISM
Filed Aug. 16, 1944   4 Sheets-Sheet 3
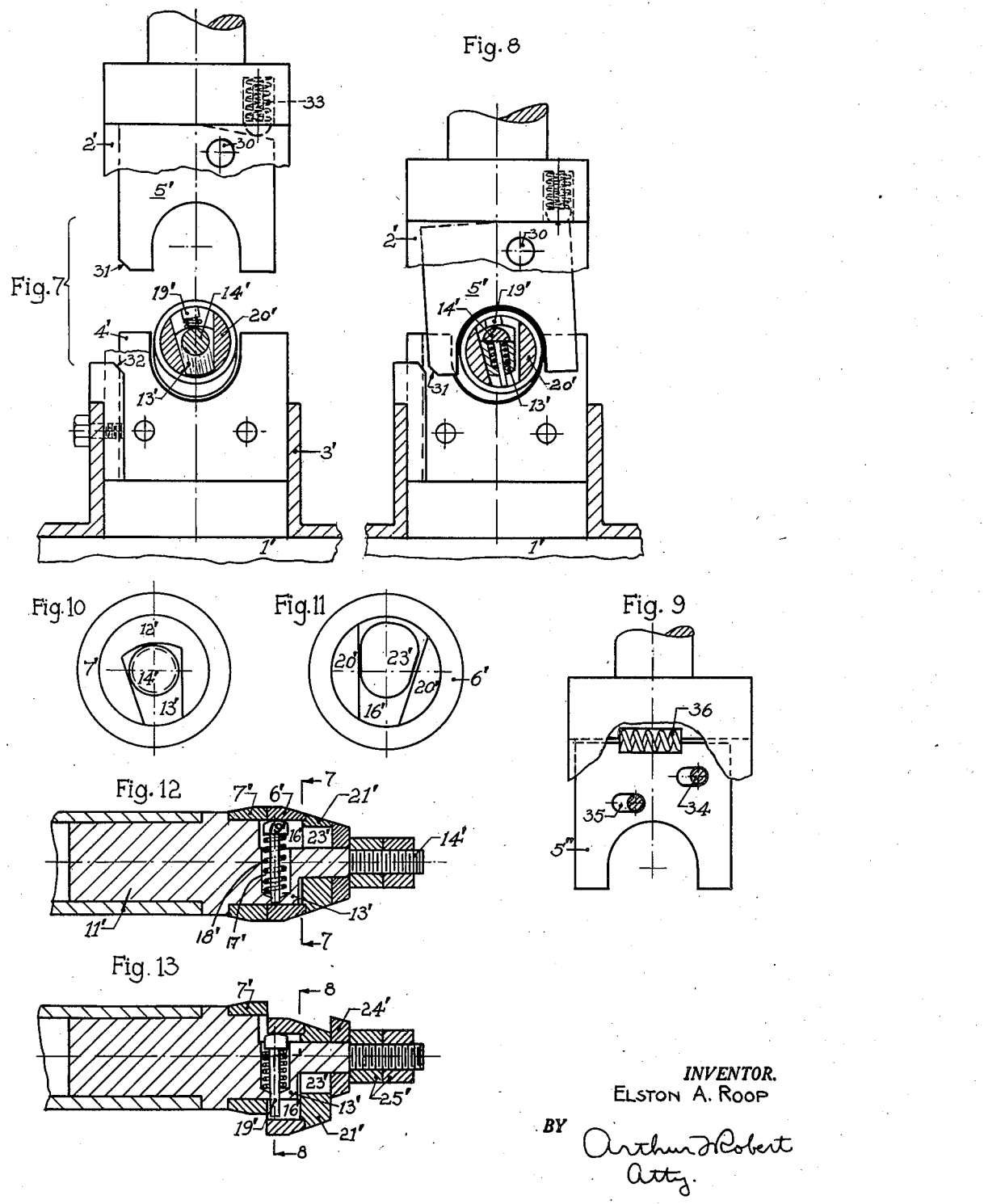

March 19, 1946.  E. A. ROOP  2,397,048
PIPE-SHEARING MECHANISM
Filed Aug. 16, 1944  4 Sheets-Sheet 4

*INVENTOR.*
ELSTON A. ROOP
BY Arthur H. Robert

UNITED STATES PATENT OFFICE 2,397,048

PIPE-SHEARING MECHANISM

Elston A. Roop, Louisville, Ky., assignor of one-half to John L. Pratt, Louisville, Ky.

Application August 16, 1944, Serial No. 549,731

22 Claim. (Cl. 164—47)

The Lothrop Patent 1,715,138 discloses a pipe shearing device, having a horizontal pipe space and a vertical shearing plane presenting front and rear faces, extending transversely across the front end portion of the pipe space, comprising: (1) a conventional punch press having a stationary base plate under and a vertically reciprocating power-member or ram over the front end portion of the pipe space; (2) a horizontal frame extending from the base plate axially underneath the pipe space toward the rear end thereof; (3) a carrier mounted on the frame for movement, along the underside of the pipe space, axially toward and from the press, the carrier being arranged to support and carry the rear end of a pipe in the pipe space; (4) an external upper or front half-die rigidly mounted on the ram to present, along the front face of the shearing plane, an external semi-circular shearing edge for the upper half of the pipe; (5) an external lower or rear half-die rigidly mounted on the base plate to support the front end of the pipe and arranged to present, along the rear face of the shearing plane, an external semi-circular shearing edge for the lower half of the pipe; (6) and a pair of separate cylindrical plugs arranged in abutting end-to-end relationship within the pipe to be sheared, one plug being a front plug extending under the front upper die and presenting, along the front face, an internal semi-circular shearing edge for the lower half of the pipe, and the other plug being a rear plug extending over the rear lower die and presenting, along the rear face, an internal semi-circular shearing edge for the upper half of the pipe.

With this arrangement, when the pipe is fed axially forward over the internal plugs to the shearing position, in which its front end portion to be severed projects from the front face of the shearing plane a distance determined by the front plug, the punch press is tripped to effect a single downward-upward reciprocation of the ram carried upper or front external die. During the downward stroke, the front external die moves from its upper inoperative position downwardly through a pipe-holding position to the bottom of the stroke. In moving beyond the pipe-holding position, the front external die forces the front section of the pipe and the front plug, as a unit, downwardly relatively to the rear plug, rear section of the pipe and the lower die thereby shearing the upper half of the pipe between the shearing edges of the front upper die, the rear plug and simultaneously shearing the lower half of the pipe between the shear edges of the front plug and the rear lower die.

The foregoing construction has the advantage of completely shearing a pipe in a single stroke. Among its disadvantages are: it requires the use of a movable clamping mechanism for rigidly clamping the pipe during the shearing operation so as to prevent the upper die from pivotally swinging the pipe about the shearing edge of the lower die; it operates to sever a section whose length equals the length of the front plug and thus not only requires a different front plug for each different length of pipe section but also requires such plug to be removed from each severed section, reinserted in the pipe as the latter is fed forwardly over the rear plug for the next shearing operation and accurately reset to replace its shearing edge along the front face of the shearing plane; and it tends to tear thin pipe at the diametrically opposed "juncture area" between the ends of the semi-circular shear lines in the upper and lower halves of each severed section.

The present invention relates to a single-stroke pipe-shearing device of this general character and has, as its principal objects: the elimination of special pipe clamping mechanisms; the provision of an internal plug assembly which is capable of shearing pipe sections of the same length and of different lengths, varying over a wide range, without requiring any adjustment or handling of the plugs; and the substantial, if not complete, elimination of the tendency to tear thin pipe at the juncture areas.

Another object of the invention is to provide in a single-stroke pipe-shearing mechanism; external dies and internal plugs of a character such that they may be employed with equal facility in shearing either straight pipe or curved elbows.

Another important object is to provide a simple and inexpensive pipe-shearing mechanism which is capable of extremely rapid and accurate operation.

The present invention, which contemplates the use of a pair of front and rear external half-dies and of front and rear internal plugs, may be carried out (a) by mounting a mandrel to extend axially through the pipe space, with its rear end secured to the horizontal frame adjacent the rear end of the pipe space and with its front end projecting through the shearing plane between upper and lower dies and terminating in free space adjacent the front side of that plane, and (b) by mounting the front and rear internal plugs upon the mandrel and holding them in axial alignment by yieldable means permitting, between the plugs, sufficient relative vertical movement for pipe shearing purposes.

With this arrangement, the pipe to be severed is thrust rearwardly over the mandrel and then fed forwardly along the mandrel until a front section of any desired length projects from the front face of the shearing plane. The press is then tripped to shear the front section on the downward stroke of the upper die. During the shearing action, the lower shearing unit (the lower die and the plug above it) remains stationary while the upper shearing unit (the upper die and the plug below it) moves relatively downward. During the upward stroke, the plugs automatically return to axial alignment while the severed section of the pipe either falls off the free front end of the mandrel or is pushed off as the next section of the pipe is fed forwardly for the next shearing operation.

Inasmuch as the rear end of the mandrel is anchored to the frame, the tendency of the upper die to swing the pipe about the lower die is completely overcome; hence the use of special clamping mechanisms is avoided. Furthermore, since the front section of the pipe may project to any extent beyond the front plug and since both plugs are permanently mounted in shearing position, the length of the front pipe section to be cut is independent of the length of the front plug while the manual operations, of removing the front plug from the severed section, reinserting it in the new front section and resetting it in shearing position, are entirely eliminated.

Where thin pipe is to be cut, the invention further contemplates an arrangement wherein the upper shearing unit is mounted, not only for vertical shearing movement relatively to the lower shearing unit, but also for relative horizontal or transverse shearing movement in order to shear the juncture areas of the pipe positively and thus avoid the tendency of the pipe to tear at these areas.

One embodiment of the invention is illustrated in Figures 1-6 wherein.

Figure 1:
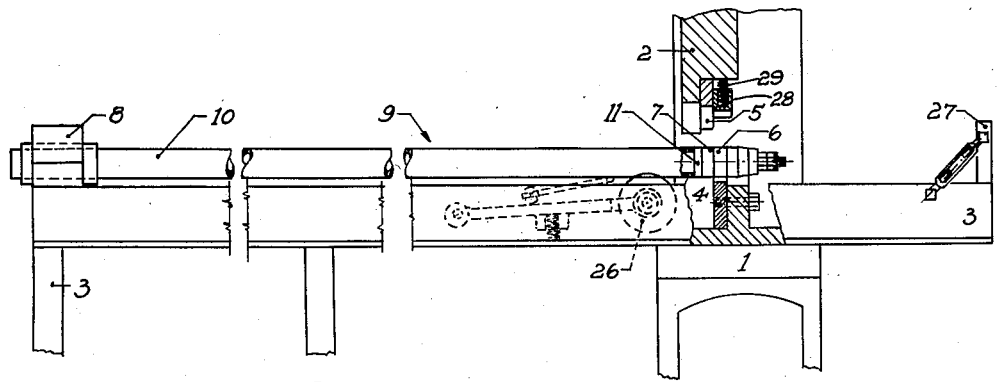
Figure 1 is a side elevation with the press schematically indicated, the horizontal frame broken off and the external dies in section.
Figure 2:
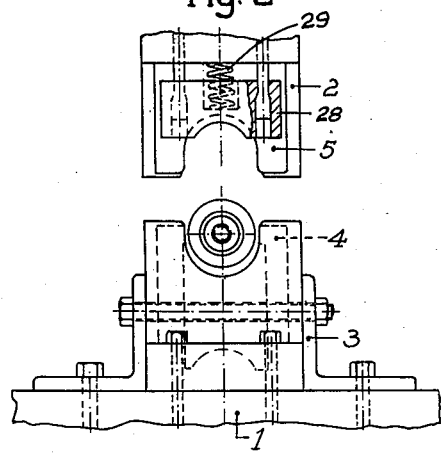
Figure 2 is a partly broken front end view.
Figure 4:
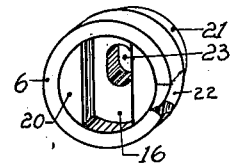
Figure 4 is another perspective view of a front plug assembly.

In the embodiment illustrated in Figures 7-13, the dies are arranged for vertical and horizontal shearing movement with the upper and lower dies on the front and rear sides of the shearing plane. In these figures:

Figure 7 is an end view, with the parts in their inoperative position, showing the upper and lower dies in elevation and the internal plugs in section along a line corresponding to 7—7 of Figure 12, the ram being partly broken away;

Figure 8 is similar to Figure 7 but with the parts at positions corresponding to the bottom of the stroke and with the internal plug section along a line corresponding to 8—8 of Figure 13;

Figure 9 is an end elevation of a modified form of a vertically and horizontally movable front upper die;

Figure 10 is a front end elevation of rear ring 7, tongue 13 and terminal section 14;

Figure 11 is a rear end elevation of front ring 6 and wings 20;

Figure 12 is a vertical section through front and rear rings in their aligned or inoperative positions; and Figure 13 is a similar view with parts in a position corresponding to the bottom of the stroke.

Figure 14:
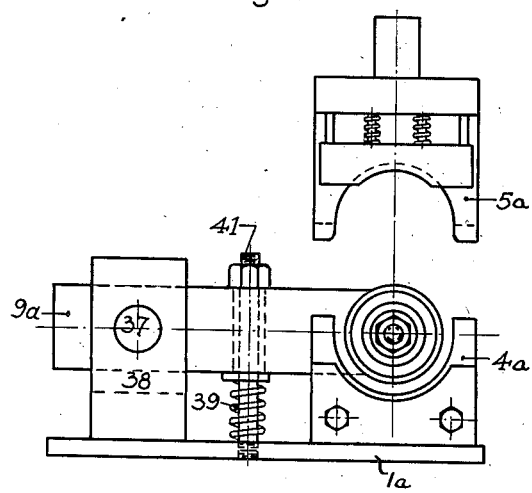
Figure 15:
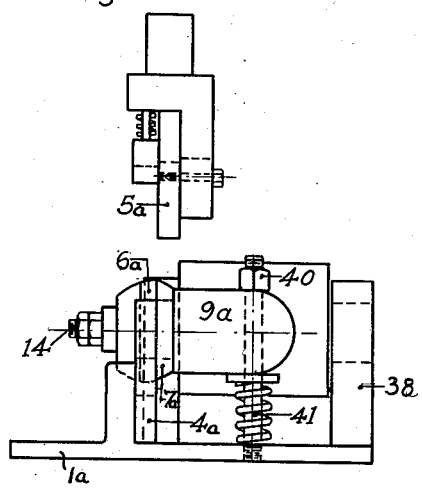
Figure 16:
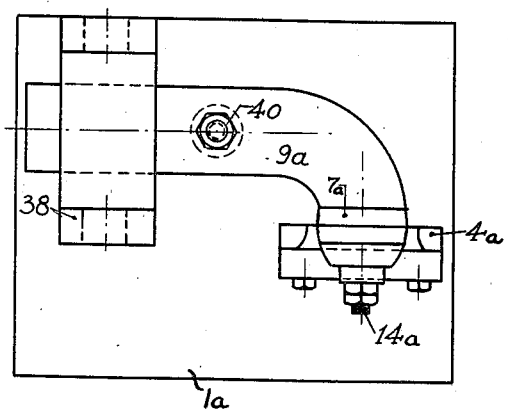

An embodiment of the invention for trimming and dividing pipe elbows is illustrated in Figures 14-16 wherein:

Figures 14 and 15 are end and side elevations respectively; and

Figure 16 is a top plan view of mandrel and lower die.

*Figures 1-6*

The single-stroke pipe-shearing mechanism illustrated in Figs. 1-6 conventionally includes: a horizontal pipe space and a vertical shearing plane presenting oppositely disposed front and rear faces extending transversely across the free end portion of the pipe space; a punch press, or equivalent device, having a stationary base plate 1 under, and a vertically reciprocating ram 2 over, the front end portion of the pipe space; a horizontal frame 3 secured at one end to the upper face of the base plate 1 and extending therefrom underneath the pipe space axially toward the rear end thereof; an external lower front half-die 4 rigidly mounted on the base plate 1 and frame 3 to present, along the front face of the shearing plane, an external semi-circular shearing edge for the lower half of the pipe; an external upper rear half-die 5 rigidly mounted on the ram 2 to present, along the rear face of the shearing plane, an external semi-circular shearing edge for the upper half of the pipe; and a pair of separate cylindrical front and rear plugs 6 and 7 arranged in abutting end-to-end relationship, the front plug 6 extending over the lower die and presenting, along the front face, an internal semi-circular shearing edge for the upper half of the pipe, and the rear plug 7 extending under the upper die 5 and presenting along the rear face an internal semi-circular shearing edge for the lower half of the pipe. In the embodiment illustrated the lower die 4 and the front plug 6 constitute the lower front shearing unit, while the upper die 5 and the rear plug 7 constitute the upper rear shearing unit but it will be understood that they may be arranged as upper front and lower rear shearing units.

Figure 3:
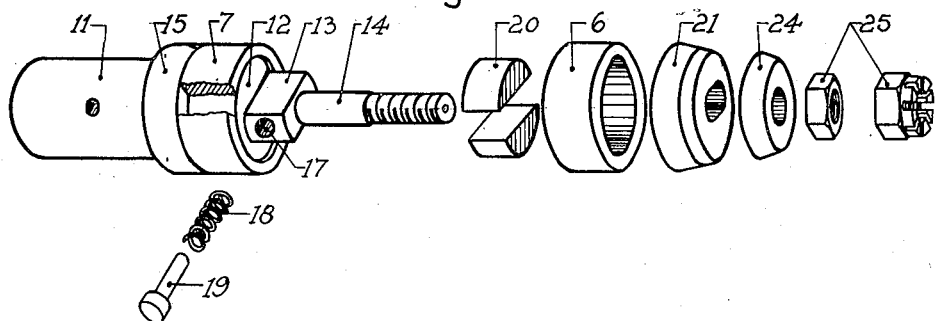
Figure 3 is an exploded perspective view of the internal plugs and associated parts.
Figure 5:
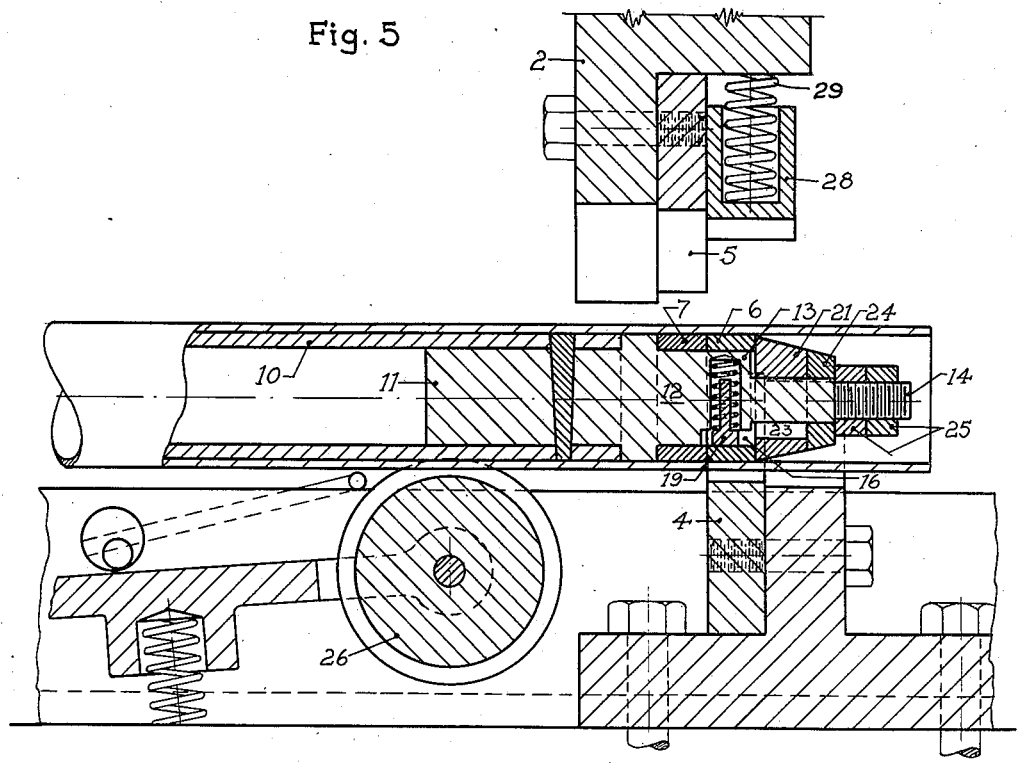
Figure 5 is a sectional view showing the die and plug parts in their respective normal or inoperative positions.
Figure 6:
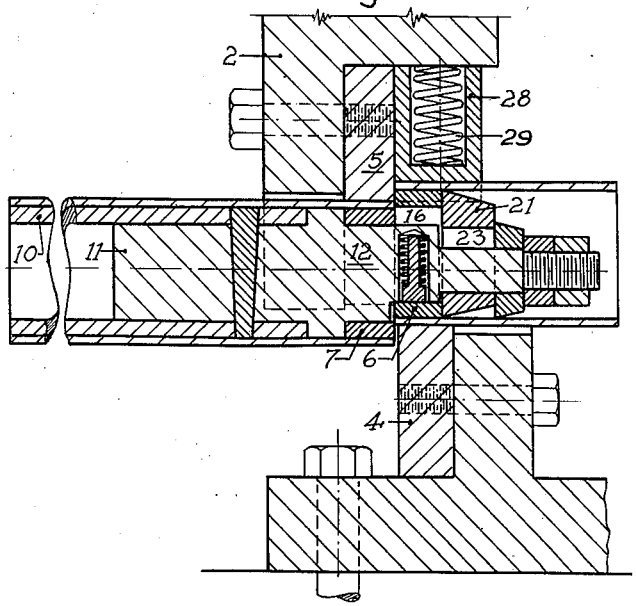
Figure 6 is a similar view of the same parts as they appear at the bottom of the stroke.

In accordance with the present invention, the plugs 6 and 7 are mounted in shearing position on the front end portion of a mandrel extending axially through the pipe space with its rear end secured to the horizontal frame 3 at the rear end of the pipe space and with its front end projecting through the shearing plane and terminating in free space on the front side of that plane. Accordingly, a clamp block 8 on frame 3 is used to anchor the rear end of the mandrel 9, which is composed of a rear section 10 in the form of a pipe and a front section 11 in the form of an arbor. The arbor 11 is rigidly mounted in the adjacent end of the pipe 10 and arranged to project therefrom through the shearing plane into free space on the front side of that plane. As indicated in Figure 3, the arbor 11 contains: adjacent the rear side of the shearing plane, a seat section 12, which corresponds to the rear ring 7; adjacent the front side of the plane, a tongue section 13, which corresponds to the front plug 6; and an axially centered terminal section 14 projecting beyond the tongue section 13.

The rear plug 7, which is fixed to the arbor, may be formed as an integral part of the seat section 12 of the arbor. Preferably, however, the rear plug is made in the form of a simple annular ring which is sweated or otherwise firmly but removably mounted on the periphery of the seat section between a radial shoulder 15 and the shearing plane. One side of the ring abuts shoulder 15 while its other side abuts the rear face of the shearing plane. A ring of this character presents four usable semi-circular shearing edges; hence, when one shearing edge is dulled, the ring may be removed and remounted to place one of its other usable shearing edges in shearing position.

The front ring plug 6 is resiliently mounted on the arbor for relative upward movement from a position of axial alignment and is guided in such movement by an internal tongue and groove connection between the arbor and the front plug. Accordingly, the tongue section 13 is made in the form of a tongue also designated 13 which extends axially into a vertical slot 16 extending diametrically across the interior of the front plug 6. With the front and rear plugs in axial alignment, the top of the tongue 13 engages the upper end wall of the slot 16, while the bottom of the tongue is spaced upwardly from the bottom wall of the slot sufficiently to permit the necessary degree of relative vertical movement. To hold these parts yieldably in axial alignment, the tongue 13 is provided with a vertical well 17 which is open at the bottom of the tongue to receive a spring 18 and a spring-engaging plunger 19, the head of which projects from the well 17 downwardly into engagement with the bottom wall of slot 16 and is urged into such engagement by the spring 18.

While the front plug may be formed integrally with the members 20, which provide the side walls of slot 16, it may be more advantageously formed as a separate annular ring which is identical to, and interchangeable with, the rear ring 7. To this end, the members 20 are integrally secured to a shoulder ring 21 to extend rearwardly therefrom in the form of axial wings, the peripheries of which cooperate to form a discontinuous annular front seat, also designated by the numeral 20. The front ring 6 is securely but removably mounted on seat 20 with one side abutting a radial face on the annular shoulder 22 of shoulder ring 21 and its other side abutting the front face of the shearing plane. The terminal section 14 of the arbor projects axially through the upper part of a slot 23 in shoulder ring 21 when the parts are in axial alignment. This slot extends vertically downward sufficiently to permit relative vertical movement between the terminal section 14 and shoulder ring 21 during the shearing action. The front plug assembly is held against axial movement by a washer 24 which is maintained in frictional engagement with the front end face of shoulder ring 21 by a pair of terminal nuts 25 threaded to the end of terminal section 14.

In operation, the pipe to be cut is thrust over the front end of the mandrel and moved axially rearward until its front end lies adjacent the shearing plane. To facilitate this operation, the front end of the mandrel is yieldably supported by a wheel 26 at a position such that the front plug 6 is spaced upwardly from lower die 4 sufficiently to permit axial movement of the pipe without interference from lower die 4. The pipe is then moved forwardly into engagement with an adjustable stop 27 which is mounted on the front end of horizontal frame 3 and adjusted axially along the pipe space to a position where the desired pipe section to be severed projects from the shearing plane forwardly to the stop.

The press is now tripped to effect a single reciprocation of the ram 2. During the downward stroke, the upper die 5 moves from its upper inoperative position downwardly beyond the holding position to the bottom of the stroke. In moving to the holding position, the upper die engages the pipe, forcing it and the mandrel downwardly. In the holding position, the front section of the pipe and the front plug 6 are held against further downward movement by the lower die 4. In moving beyond the holding position, the upper die 5 forces the rear section of the pipe, the mandrel and the rear plug 7 downwardly, relatively to the front plug and lower die. During this movement, the shearing edge of upper rear die 5 passes downwardly across the shearing edge of the front plug 6 while the shearing edge of the rear plug 7 simultaneously moves downwardly across the shearing edge of the front lower die 4, thereby shearing both halves of the pipe.

During the upward stroke, the yieldable support 26 returns the free end of the mandrel to its initial position while the spring 18 forces the front plug 6 back into axial alignment with the rear plug. In some cases there may be a tendency of the upper die 5 to lift the mandrel due to frictional contact between the front face of upper die 5 and the rear face of the front plug 6. This however, may be overcome by resiliently mounting, on upper die 5, a pusher 28 for yieldable movement from the extended position in which it extends slightly below the shearing edge of upper die 5 to a retracted position in which it extends slightly above such edge. During the downward stroke the pusher will engage the front section of the pipe and be moved by that engagement to its retracted position. During the upward stroke, however, it will be resiliently urged by spring 29 toward its extended position with sufficient force to free the upper die from frictional engagement with either a severed pipe section or the front plug 6. The severed section of the pipe will either fall off the free end of the mandrel during the upward stroke or will be pushed off as the next pipe section is fed into place.

*Figures 7–12*

The shearing edges of the upper and lower dies of Figures 1–6 do not necessarily cut completely through the pipe because, after they have penetrated the pipe walls a certain distance, the pipe usually breaks along the cutting plane. In thick pipe this break is straight and sharp or even entirely across the pipe even at the juncture areas where the minimum shearing edge penetration occurs. However, in thin pipe there is a tendency for the pipe to tear at the juncture areas. In accordance with another phase of this invention, the tendency of thin pipe to tear at the juncture areas is avoided by moving the shearing edges of one shearing unit, during the shearing stroke, both vertically and horizontally across the shearing edges of the other shearing unit so as to shear the juncture areas positively to the extent necessary to produce a clean break. Furthermore, the quick bending of the mandrel 9, during the shearing action, places an additional load on the shearing equipment generally and on the mandrel anchor 8 specifically. This load, and the strains occasioned by it, can be reduced somewhat by arranging the parts for shearing operation with the upper and lower dies respectively on the front and rear sides of the shearing plane so that the lower die holds the mandrel stationary during the shearing action.

Accordingly, in Figures 7–12, wherein the parts corresponding to those of Figures 1–6 are given the same numbers followed by a prime sign, the lower die 4' is mounted as before, except at the rear of the plane. The upper die 5' is positioned at the front of the plane but, insead of being rigidly mounted on the ram 2', it is pivotally mounted, by means of a pivot pin 30, for yieldable horizontal movement from its normal position shown in Figure 7 pivotally to the position shown in Figure 8. To move the upper die 5' horizontally, as it approaches the bottom of the stroke, it is provided with a slanting or cam surface 31 arranged, at one of its lower corners, to engage a cam 32 mounted on frame 3'. The upper die 5' is resiliently held in its initial position by a spring biased plunger 33. In place of pivot pin 30 and plunger 33, the upper die may be slidably mounted on the ram, as shown in Figure 9 wherein the upper die 5" is slidably mounted for relative transverse movement by means of ram pins 34 in die slots 35, and yieldably held in its initial position by spring 36.

The front plug assembly must of course move sidewise with the front upper die 5'; hence both front and rear plug assemblies must be constructed to accommodate relative sidewise movement. Accordingly, the tongue 13' and the tongue-receiving slot 16' are slightly altered in shape so that their walls diverge upwardly, one corresponding side wall of each extending vertically and the other being slanted. The parts are normally positioned in axial alignment with their respective vertical tongue and slot walls on that side of the pipe axis, toward which the horizontal shearing movement occurs, and with the bottom of the slot snugly fitting around the bottom of the tongue. They are yieldably held in axial alignment as before but the well 17', spring 18' and plunger 19' extend upwardly instead of downwardly while the plunger is made sufficiently long to project through a bottom opening in the tongue. Now when the front ring 6' moves relatively downward, the vertical wall of slot 16' will slide downwardly along the vertical wall of tongue 13', but the slanted wall of slot 16' will recede downwardly away from the slanted wall of the tongue 13' creating, between them near the bottom of the stroke, a space of sufficient horizontal extent to accommodate the requisite degree of horizontal shearing movement. The axial opening 23' is likewise provided with straight and slanted sidewalls to permit it to move downwardly and then horizontally relatively to the terminal section 14'.

It will be noted that the peripheries of the front and rear rings 6' and 7' extend from the shearing plane parallel to their common axis for a short distance and then taper inwardly so that each ring interchangeably presents two usable shearing edges. The front ring is tapered to reduce frictional contact with the severed pipe section to a degree such that the severed section will tend to fall gravitationally from the front end of the mandrel automatically upon severance. The rear ring is tapered so that its rear end is flush with the adjacent portion of the mandrel, the latter being reduced in diameter to reduce frictional contact and to accommodate pipes which are slightly bent. Welded pipe, for example, is usually sufficiently warped to render its axial movement, over a close fitting mandrel, extremely difficult.

The foregoing makes evident that the upper die is moved vertically downwardly through a pipe-holding position to the bottom of the stroke and, adjacent the bottom, is also moved horizontally. In moving to the pipe-holding position, the upper die engages the front section of the pipe and moves both pipe and mandrel downwardly. In the pipe-holding position, the lower die holds the rear section of the pipe, the rear plug 7' and the mandrel against further downward movement. In moving beyond the pipe-holding position, the upper die moves vertically downward until cams 31 and 32 are brought into engagement with each other and thereafter moves both horizontally and vertically. At the same time the upper die forces the front ring 6' to move in a similar manner that is to say, vertically downward, until the cams 31 and 32 are brought into engagement and thence both vertically and horizontally to the bottom of the stroke. In this way, the shearing edges of the front shearing unit are made to move downwardly across the shearing edges of the rear shearing unit and thence both horizontally and downwardly across such edges thereby effecting a positive shearing action at the juncture areas.

*Figures 14–16*

One important advantage of the present invention arises from the fact that it can be readily adapted for cutting bent tubings such as elbows. For example, in one method of manufacturing elbows: a straight pipe section is bent to form an elbow extending circularly through 180°; the ends of the 180° elbows are trimmed to provide straight and even end edges; and, whenever smaller angles are desired, the 180° elbows are subdivided to form 90° elbows, 45°, etc. In the embodiment for trimming and subdividing elbows, disclosed in Figures 14–16, wherein the parts corresponding to those of Figures 1–6 are given the same numerals followed by the letter a, the lower and upper dies 4a and 5a are mounted as before. The internal plugs 6a and 7a are mounted on a mandrel 9a, the free end of which projects from the front face of the shearing plane. Since curved pipe is to be cut, the pipe space curves horizontally through an arc which could be but need not be more or less than 90°. The mandrel 9a curves axially through the pipe space with its front and rear ends extending straight forwardly and straight rearwardly respectively from the front and rear limits of the 90° angle, the front limit corresponding to the shearing plane. The rear end of the mandrel is pivotally mounted, by means of a pin 37, upon a bracket 38 which is rigidly secured to the base plate 1a. In this connection it may be noted that a pivotal connection is employed for the rear end of the mandrel because of its short length. Where a long mandrel is employed as in Figure 1, the rear end could be pivotally mounted but is preferably rigidly mounted because the resiliency of the mandrel is sufficient to accommodate all desirable degrees of vertical and horizontal movement. The mandrel 9a is yieldably held at a position such that front and rear plugs are spaced from the lower and upper dies by means of a spring 39, which urges the mandrel upwardly against a stop in the form of a nut 40 on a stud bolt 41 which is anchored to the base plate 1a. With this arrangement, each end of an elbow may be trimmed simply by placing such end over the free end of the mandrel and tripping the press. The trimmed elbow may be subdivided into smaller sections by thrusting the elbow over the arcuate end of the mandrel an appropriate distance and then tripping the press.

Having described my invention, I claim:

1. An internal plug assembly for a pipe-shearing device of the class described comprising: a pipe-space mandrel member; front and rear internal pipe-shearing plugs mounted on the mandrel member, in abutting end-to-end relationship, for relative transverse pipe-shearing movement from an axially aligned position to an offset position; and resilient means urging the plugs transversely toward and yieldably holding the plugs in axial alignment.

2. An internal pipe-shearing assembly for use in a pipe-shearing mechanism of the class described wherein the pipe-shearing plane presents front and rear faces extending transversely across the pipe space, comprising: a mandrel member adapted to extend axially within the pipe space and through the shearing plane; front and rear internal pipe-shearing plugs mounted, on the mandrel member along the front and rear faces respectively of the plane, for relative transverse pipe-shearing movement along the plane from an axially aligned position to a transversely offset position; and resilient means urging the plugs transversely toward and yieldably holding the plugs in axial alignment.

3. The assembly of claim 2 wherein: one plug is rigidly mounted on the mandrel member and the other resiliently mounted thereon.

4. The assembly of claim 2 wherein: the plugs are in the form of annular, interchangeable, removably-mounted rings, each presenting at least two usable semi-circular shearing edges.

5. An internal pipe-shearing assembly for use in a pipe-shearing mechanism of the class described having a pipe-shearing plane which present front and rear faces extending transversely across the pipe space comprising: a mandrel member adapted to extend axially within the pipe space and through the shearing plane, said mandrel member having a front end portion containing a seat section at one side of the plane and a tongue section projecting through the plane; one internal shearing means rigidly mounted on the seat section to present an internal shearing edge along the one face of the plane for one-half of the pipe; another internal shearing means extending around the tongue section to present a shearing edge along the other face of the plane for the other half of the pipe; means mounting said other shearing means on the mandrel member for transverse shearing movement, relatively to said one shearing means, from an axially aligned position to a transversely offset position; and resilient means yieldably urging said other shearing means transversely toward and normally holding it in axial alignment.

6. The assembly of claim 5 wherein: each shearing means includes an annular removably-mounted shearing ring presenting at least two usable semi-circular shearing edges.

7. The assembly of claim 5 wherein: the mounting means include a tongue and groove connection between the mandrel member and said other shearing means to guide the latter into axial alignment with said one shearing means upon relative movement toward such position.

8. The assembly of claim 5 wherein the mounting means include: means forming in said other shearing means a transverse slot extending in the direction of transverse shearing movement and positioned to receive said tongue section which extends axially into said slot and cooperates with the walls adjacent one end of the slot to guide said other shearing means into axial alignment with said one shearing means upon relative movement therebetween toward such position.

9. An internal pipe-shearing assembly for use in a pipe-shearing mechanism of the class described having a pipe-shearing plane which presents front and rear faces extending transversely across the pipe space, comprising: a mandrel member adapted to extend axially within the pipe space and through the shearing plane said mandrel member having a seat section at one side of the plane and a tongue section projecting through the plane; one shearing means rigidly mounted on the seat section to present an internal shearing edge along the one face of the plane for one-half of the pipe and for one juncture area between pipe halves; another shearing means extending around the tongue section to present an internal shearing edge along the other face of the plane for the other half of the pipe and the other juncture area; means mounting said other shearing means on the mandrel member for yieldable transverse shearing movement, from a position of axial alignment with said one shearing means, along a path extending crosswise in the general direction of said other half of the pipe and for additional transverse shearing movement, as it recedes from axial alignment, sidewise in the general direction of said other juncture area; and means yieldably urging said other shearing means transversely toward and normally holding it in its position of axial alignment.

10. The assembly of claim 9 wherein: the mounting means include a tongue and groove connection between the mandrel member and said other shearing means to guide such shearing means into axial alignment with said one shearing means upon relative movement therebetween toward such position, said tongue and groove being dimensioned in the direction of shearing movement to permit relative crosswise shearing movement between shearing means, the groove diverging from the end, which correspond to the axially aligned position, to provide sufficient clearance to accommodate relative sidewise shearing movement during such crosswise shearing movement.

11. The assembly of claim 1 wherein the mandrel member curves through an elbow pipe space to accommodate pipe elbows.

12. The assembly of claim 2 wherein the mandrel member curves through an elbow pipe space to accommodate pipe elbows.

13. The assembly of claim 5 wherein the mandrel members curves through an elbow pipe space to accommodate pipe elbows.

14. The assembly of claim 9 wherein the mandrel member curves through an elbow pipe space to accommodate pipe elbows.

15. A single-stroke pipe-shearing mechanism, having a pipe-shearing plane which presents front and rear faces extending transversely across the front end of a pipe space over which a pipe may be placed, comprising: a pipe-space mandrel extending axially through the pipe-space with its rear end secured at the rear end of the pipe-space and its front end projecting through the shearing plane into free space on the front side of that plane; a pair of front and rear internal pipe-shearing plugs mounted on the mandrel for relative pipe-shearing movement from an axially aligned position transversely to an offset position; resilient means yieldably urging the plugs transversely toward and holding the plugs in axial alignment; a pair of external front and rear half dies positioned on opposite sides of the pipe-space directly opposite the front and rear plugs respectively, said dies being arranged for relative initial movement from their inoperative positions toward each other to a holding position in which they press against opposite sides of a pipe on the mandrel and for relative shearing movement from the holding position toward each other to an end position during which shearing movement each die on each side of the plane cooperates with the plug on the same side of the plane to effect relative movement between plugs, from their axial position to their offset position, and with the plug on the opposite side of the plane to shear that half of a pipe extending between them; and means for effecting relative reciprocation of the dies between their inoperative and end positions.

16. The mechanism of claim 15 wherein: the mandrel normally is resiliently held at a position such that the front and rear plugs are spaced from the front and rear dies respectively.

17. The mechanism of claim 15 wherein: the external die and internal plug on one side of the plane are arranged for sidewise movement relatively to the die and plug on the other side of the plane; and means are provided for effecting such sidewise movement on the shearing stroke during relative pipe-shearing movement between plugs so that each die on each side of the shearing plane cooperates with the plug on the opposite side to shear the adjacent juncture area between pipe halves.

18. A single-stroke pipe-shearing mechanism having a vertical pipe-shearing plane which presents front and rear faces extending transversely across the front end of a horizontal pipe-space over which a pipe may be placed comprising: a pipe-space mandrel extending horizontally through the pipe-space with its rear end secured at the rear end of the pipe-space and its front end projecting through the shearing plane into free space on the front side of that plane; a pair of front and rear internal pipe-shearing plugs mounted on the mandrel for relative movement from an axially aligned position downwardly to an offset position; resilient means yieldably holding the plugs in axial alignment; a lower external die stationarily mounted on one side of the plane below one plug; an upper die mounted on the other side of the plane above the other plug for initial movement from an upper inoperative position downwardly to a holding position in which it presses a pipe on the mandrel downwardly against the lower die and for shearing movement from the holding position downwardly to an end position during which movement it shears the upper half of the pipe across the shearing edge of the plug on the opposite side of the plane and simultaneously forces the plug below it downwardly to its relatively offset position causing it to shear the lower half of the pipe across the shearing edge of the lower die; and means for effecting a downward-upward reciprocation of of the upper die between its inoperative and end positions.

19. The mechanism of claim 18 wherein: the upper die and the downwardly movable plug below it are arranged for sidewise movement; and means operative, during the downward movement of said plug, to effect sidewise movement of said plug and upper die as a unit relatively to the other plug and die in order to shear the juncture areas between pipe halves.

20. The assembly of claim 1 wherein: the mandrel member is in the form of an arbor having a seat section and a tongue section which are axially immovable relatively to each other; one plug being rigidly mounted on the seat section and the other plug being arranged around the tongue section for transverse movement relative to both sections of the arbor; and the resilient means being carried by the arbor yieldably interposed, at the tongue section, between the arbor and said other plug.

21. The assembly of claim 2 wherein: the mandrel member is in the form of an arbor having a seat section and a tongue section which are axially immovable relatively to each other, the seat section being positioned at one side of the plane and the tongue section projecting through the plane; one plug being rigidly mounted on the seat section and the other arranged around the tongue section for transverse movement relative to both sections of the arbor; and the resilient means being carried by the arbor yieldably interposed, at the tongue section, between the arbor and said other plug.

22. A single-stroke pipe-shearing mechanism, having a pipe-shearing plane which presents front and rear faces extending transversely across the front end of a pipe space over which a pipe may be placed, comprising: a pipe-space mandrel terminating at its front end in an arbor and extending axially through the pipe-space with its rear end secured at the rear end of the pipe-space and its arbor projecting through the shearing plane into free space on the front side of that plane; a pair of front and rear internal pipe-shearing plugs mounted on the arbor at opposite sides of the plane for relative pipe-shearing movement from an axially aligned position transversely to an offset position; resilient means mounted on the arbor for yieldably urging the plugs transversely toward and holding them in axial alignment; a pair of external front and rear dies positioned on opposite sides of the shearing plane respectively adjacent the front and rear plugs and arranged for relative shearing movement from a pipe holding position toward each other to an end position during which shearing movement each die on each side of the plane cooperates with the plug on the same side of the plane to effect relative movement between plugs, from their axial position to their offset position, and with the plug on the opposite side of the plane to shear that half of a pipe extending between them; and means for effecting relative reciprocation of the dies between their pipe holding and end positions.

ELSTON A. ROOP.